(12) United States Patent
Teta et al.

(10) Patent No.: US 6,913,928 B2
(45) Date of Patent: Jul. 5, 2005

(54) HAZARDOUS CHEMICAL SIMULANTS

(75) Inventors: Nicholas L. Teta, Las Vegas, NV (US); David Brown, Columbus, OH (US); Michael Glass, Centerville, UT (US)

(73) Assignee: Technical Solutions Group International, Las Vegas, NV (US)

( * ) Notice: Subject to any disclaimer, the term of this patent is extended or adjusted under 35 U.S.C. 154(b) by 0 days.

(21) Appl. No.: 10/117,458

(22) Filed: Apr. 8, 2002

(65) Prior Publication Data

US 2003/0190594 A1 Oct. 9, 2003

(51) Int. Cl.$^7$ .......................... G01N 31/00; G01N 33/00
(52) U.S. Cl. ............................. 436/8; 436/9; 436/104; 436/164; 436/172; 252/408.1
(58) Field of Search ............................. 436/8, 9, 164, 436/172, 800, 104; 252/408.1

(56) References Cited

U.S. PATENT DOCUMENTS

| | | | |
|---|---|---|---|
| 3,844,905 A | * 10/1974 | Epstein et al. ........... 205/785.5 |
| 4,655,235 A | 4/1987 | Scott, Jr. ..................... 134/99 |
| 4,858,465 A | 8/1989 | Molina ........................ 73/104 |
| 5,019,518 A | * 5/1991 | Diehl et al. ................. 436/172 |
| 5,140,986 A | 8/1992 | Klingner |
| 5,670,469 A | 9/1997 | Dingus et al. .............. 510/274 |
| 5,722,835 A | * 3/1998 | Pike ........................... 434/218 |
| 5,976,881 A | 11/1999 | Klingner ....................... 436/3 |
| 6,046,150 A | * 4/2000 | Choy et al. ................. 510/376 |
| 6,566,138 B1 | * 5/2003 | Seitzinger et al. ............. 436/8 |

* cited by examiner

*Primary Examiner*—Maureen M. Wallenhorst
(74) *Attorney, Agent, or Firm*—Morrison & Foerster LLP

(57) ABSTRACT

Disclosed are hazardous chemical simulant compositions that can be used to simulate hazardous chemicals and methods for using hazardous chemical simulants. The compositions can include a phosphor, which emits visible light in the presence of ultraviolet light. The methods of using hazardous chemical simulants includes exposing a hazardous chemical simulant to special lighting conditions so that its location can be easily detected.

5 Claims, 1 Drawing Sheet

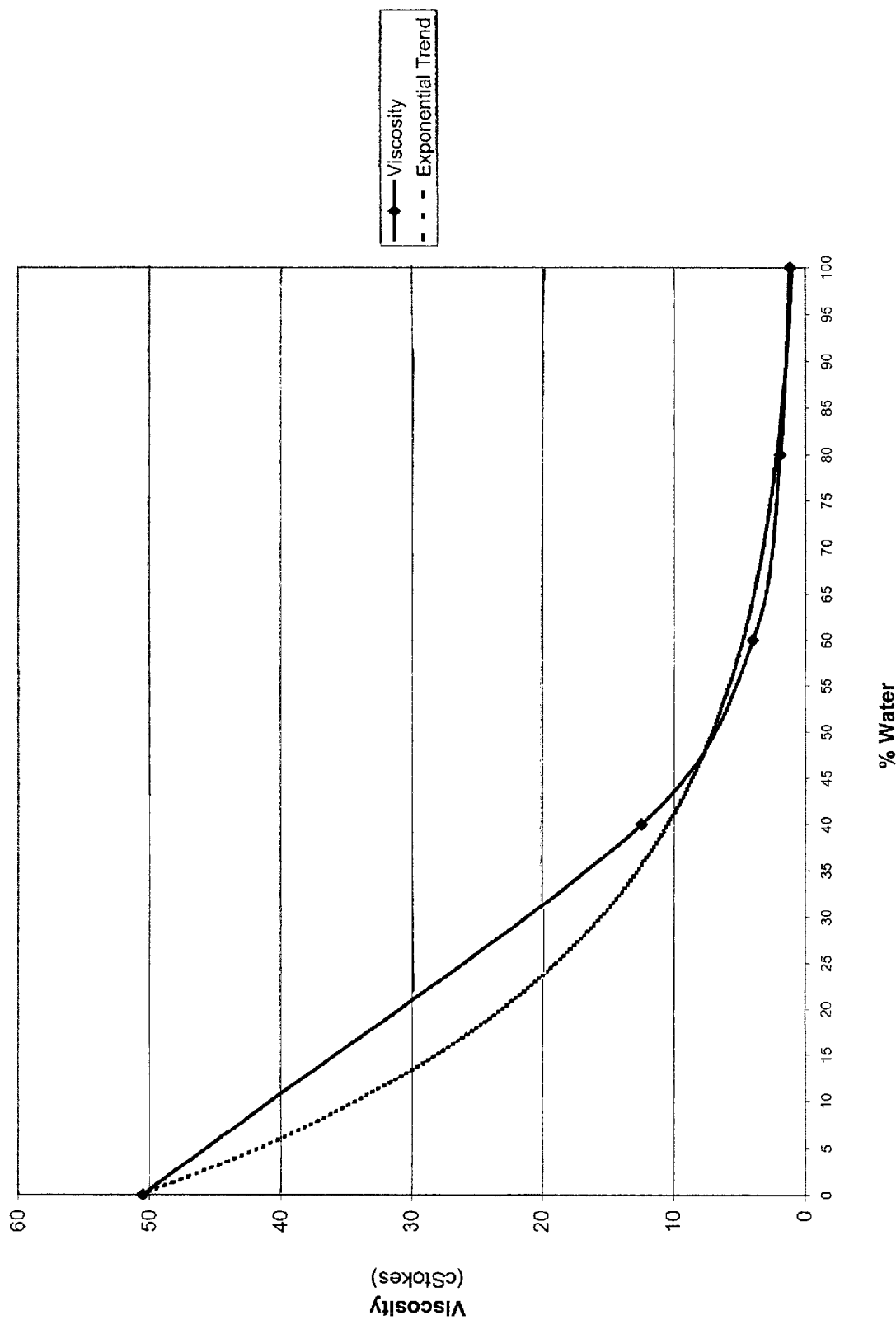
Figure

HAZARDOUS CHEMICAL SIMULANTS

FIELD OF THE INVENTION

This invention relates to simulants that can simulate hazardous chemicals. In particular, this invention relates to hazardous chemical simulants that can be easily detected under special lighting conditions.

BACKGROUND OF THE INVENTION

Chemical and biological compounds have a variety of uses in the world today. Many of these chemical and biological compounds can have harmful effects on people who are exposed to them. Moreover, currently a number of hazardous compounds are produced especially for their harmful effects. For example, nerve agents, mustard agents, hydrogen cyanide, tear gases, arsines, and toxins have all been used to produce chemical weapons with varying degrees of detrimental effects. Needless to say, these chemical warfare agents can be extremely dangerous.

Special equipment and procedures are often needed by personnel to avoid injury in areas contaminated by chemical accidents or by chemical warfare agents. These personnel can include, for example, HAZ-MAT workers, soldiers, firefighters, and others that may come into contact with hazardous compounds. For safety reasons, training personnel to deal with exposure to these compounds is preferably not conducted with actual hazardous compounds. Therefore, there is a need for hazardous chemical simulants that can safely be used for training personnel. These hazardous chemical simulants should preferably be capable of mimicking physical characteristics of hazardous compounds, but are non hazardous themselves. The compounds should also be easily detectable, so that the effectiveness of decontamination procedures can be determined.

One problem with hazardous compounds is that they can not always be easily seen. These compounds may be colorless, or harmful in minute concentrations that can not easily be detected by the human eye. Personnel who may be exposed to these compounds must, therefore, be trained to avoid a hazard that they can not always see. Therefore, a hazardous chemical simulant which can not be easily seen during training exercises, and yet can be detected even in minute concentrations when desired, is needed for training personnel and to help judge the effectiveness of protective clothing and procedures.

For example, special equipment such as protective clothing can help personnel avoid exposure to even minute concentration of hazardous compounds. The outside of protective clothing can become contaminated when personnel work in a contaminated area. When removing or handling this clothing, personnel must learn to remove and handle this equipment without contaminating themselves. A hazardous chemical simulant could be used to safely teach personnel to deal with hazardous chemicals, without the dangers associated with the actual hazardous chemicals.

Visually detectable chemical agents are known. For example, U.S. Pat. No. 5,670,469 discloses compositions that contain coloring agents that are visually detectable under normal lighting conditions. The compositions can be applied to surfaces and then wiped off. The detecting agent allows one to determine which surfaces have been wiped off and, therefore, which surfaces have been cleaned or decontaminated. However, there is no description of hazardous chemical simulants that can be used to mimic hazardous chemical compounds.

U.S. Pat. No. 5,976,881 discloses a device for assessing the level of protection provided by protective clothing. The device comprises a reaction pad that attaches to protective clothing. The pad gives a visual indication when exposed to a specific chemical reagent. Although the device provides a method of detecting the presence of specific chemicals reagents, there is no description of any hazardous chemical simulants that can be used to mimic hazardous chemical compounds during training exercises.

U.S. Pat. No. 4,858,465 discusses contaminant locating and identifying compositions that can contain fluorescent dyes. The contaminant locating composition is repelled by oily contaminants and serves to outline the contaminated area. The composition detecting composition can then be applied to the oil based contaminant to mark the contaminant with a fluorescent dye. The location of the oily contaminant can then be identified under an ultraviolet light.

The prior art has failed to provide a hazardous chemical simulant that can both simulate the physical properties of hazardous chemical compositions and can be easily located when desired. Such a hazardous chemical simulant would be an invaluable tool in training personnel to handle hazardous chemical contamination.

SUMMARY OF THE INVENTION

Disclosed are hazardous chemical simulant compositions that can be used to simulate hazardous chemicals and methods for evaluating the effectiveness of decontamination procedures using chemical simulant compositions. Preferably, the hazardous chemical simulants are difficult to visually detect under normal lighting conditions, but are easily detected when exposed to an ultraviolet light.

In one embodiment, the hazardous chemical simulant comprises from 0.1% to 99.9% diluent, 0.1% to 99.9% thickening agent, and a detecting agent. The detecting agent fluoresces in the presence of ultraviolet light. Preferably, the diluent comprises water. Preferably, the thickening agent comprises PEG, more preferably PEG200. Preferably, the hazardous chemical simulant is colorless in normal lighting conditions.

Another aspect of the invention includes a method for evaluating the effectiveness of a decontamination procedure. The method includes applying a hazardous chemical simulant to an object surface. After the hazardous chemical simulant has been applied to the surface, a decontamination procedure is performed under a first lighting condition. Following the decontamination procedure the hazardous chemical simulant is viewed under a second lighting condition to visually locate the hazardous chemical simulant.

Preferably, the hazardous chemical simulant comprises a phosphorous compound. Preferably, the hazardous chemical simulant comprises a detecting agent, a thickening agent, and a diluent. Preferably, the detecting agent comprises Tinopal. Preferably, the thickening agent comprises PEG. More preferably, the thickening agent comprises PEG200. Preferably, the diluent comprises water. Preferably, the object comprises clothing or decontamination equipment. Preferably, the decontamination procedure comprises removing contaminated clothing. Preferably the hazardous chemical simulant is colorless under the first lighting condition. Preferably, the second lighting condition is an ultraviolet light.

BRIEF DESCRIPTION OF THE DRAWINGS

This invention will be better understood by reference to the Detailed Description of the Invention when taken together with the attached FIGURE of a plot of viscosity of a mixture of water and PEG200 v. vol. % water at 22° C., with an exponential fit of the data points.

DETAILED DESCRIPTION OF THE INVENTION

Hazardous chemical simulants in accordance with the present invention may provide liquid hazardous chemical simulants that can be made to mimic one or more physical properties of actual hazardous compounds, but are relatively safe themselves. The hazardous chemical simulants may include a detecting agent that allows for the detection of the hazardous chemical simulant under special lighting conditions, but which may be more difficult to see under normal lighting conditions. Preferably, the detecting agent allows the hazardous chemical simulant to be visually detected even when the hazardous chemical simulant is present in low concentrations. The hazardous chemical simulant may also include one or more thickening agents and diluents. By balancing the amount of the thickening agent(s) and the amount of diluent(s), the viscosity of a hazardous chemical simulant can be made to posses the same viscosity as a known hazardous chemical.

Many hazardous chemical simulants may be difficult to see under normal lighting conditions. As used herein, the term normal lighting conditions means and includes conditions in which a simulated chemical contamination exercise occurs. Simulated chemical contamination exercises can be used, for example, to train personnel, to judge the effectiveness of decontamination procedures, and to judge the effectiveness of clothing and equipment used by personnel. Preferably, normal lighting conditions include white light. Preferably, the detecting agent is difficult to see under normal lighting conditions. Personnel can then be trained to avoid chemical contaminates that they can not always see.

The detecting agent can be more easily seen under special lighting conditions. Under special lighting conditions, the detecting agent can be seen and the effectiveness of, for example, decontamination procedures and protective clothing can be determined. Preferably, the detecting agent comprises a phosphor. A phosphor emits visible light when exposed to some sort of radiation.

Preferably, the special lighting conditions comprises ultraviolet light. Ultraviolet light can not normally be seen by the human eye. A phosphorous compound that responds to ultraviolet light, converts ultraviolet light into visual light that can be seen by the human eye.

The detecting agent can comprise one or more phosphorus compounds that can not easily be seen under normal lighting conditions. When exposed to an ultraviolet light or comparable light, these compounds will glow allowing for their detection. A preferable manner of producing ultraviolet light is by using a black light. A black light produces mostly UVA light instead of UVB light. UVA light is less harmful to personnel than UVB light.

A preferred phosphorous compound includes Tinopal™. Preferably the phosphorus compound comprises from about 0.0001 vol. % to about 25 vol. % of the hazardous chemical simulant. More preferably, the phosphorus compound comprises from about 0.0005 vol. % to about 20 vol. % of the hazardous chemical simulant. Most preferably, the phosphorus compound comprises from about 0.001 vol. % to about 10 vol. % of the hazardous chemical simulant.

Viscosity is an important characteristic of liquid compounds. Hazardous chemical simulants can be made to have the same viscosity as an actual hazardous compound by combining one or more thickening agents and diluents.

A thickening agent is a compound used to increase the viscosity of the hazardous chemical simulant. Preferably, the thickening agent is soluble in the diluent. Preferably, the thickening agent is water soluble. The thickening agent, for example, can comprise one or more water soluble polymers. Preferred thickening agents comprise polyethylene glycol (PEG), polypropylene glycol, glycol ethers, carboxymethyl cellulose, plant gum, polyvinyl pyrrolidone, polyvinyl alcohol, polyethylene oxide, alginates, pectin, gelatin, polyacrylamide, polyacrylic acid, polyethylene glycol, polypropylene glycol, starches, or analogs as well as derivatives thereof. More preferred thickening agents comprises PEG, more preferably PEG200 (polyethylene glycol with a molecular weight of 200).

Preferably, from about 0.1 vol. % to about 99.9 vol. % of the hazardous chemical simulant comprises a thickening agent. More preferably from about 1 vol. % to about 99 vol. % of the hazardous chemical simulant comprises a thickening agent. Most preferably, from about 10 vol. % to about 90 vol. % of the hazardous chemical simulant comprises a thickening agent.

Preferably, the hazardous chemical simulants comprise one or more diluents. The viscosity of the chemical stimulants can be decreased by increasing the amount of the diluent in comparison to the thickening agent. Diluents are compounds that have a viscosity lower than the thickening agents. Preferably, the diluents are non toxic and colorless under normal lighting conditions. A preferred diluent is water.

Preferably, from about 0.1 vol. % to about 99.9 vol. % of the hazardous chemical simulant comprises a diluent. More preferably from about 1 vol. % to about 99 vol. % of the hazardous chemical simulant comprises a diluent. Most preferably, from about 10 vol. % to about 90 vol. % of the hazardous chemical simulant comprises a diluent.

The hazardous chemical simulant can be used for a variety of purposes. For example, the hazardous chemical simulant can be applied to various surfaces during a training or evaluation exercise. These surfaces can include, for example, clothing worn by personnel, equipment used by personnel, and any other surface that may be contaminated by a hazardous chemical. After the hazardous chemical simulant has been applied to one or more surfaces, training and/or evaluation exercises can take place. After and/or during the training exercises the location of the hazardous chemical simulant can be determined using a special light, for example an ultraviolet light.

Training exercises can include, for example, training personnel various decontamination procedures. The hazardous chemical simulant can be applied to various surfaces in a contaminated area. Personnel can then attempt to remove the hazardous chemical simulant from these surfaces under normal lighting conditions. The effectiveness of the removal process can then be determined by viewing the contaminated area under a special light.

The effectiveness of protective clothing can also be gauged using hazardous chemical simulants. For example, the hazardous chemical simulant can be applied to the outside of protective clothing. The inside surfaces of the protective clothing, or the skin of personnel wearing the clothing, can be viewed under special light to determine whether any of the hazardous chemical simulant penetrated the clothing.

Personnel wearing contaminated protective clothing can often become contaminated when taking off the protective clothing. When taking off contaminated protective clothing, the unprotected surfaces of personnel become exposed. Personnel can be taught techniques to avoid contaminating themselves during this vulnerable procedure. The effectiveness of these techniques, and the personnel using them, can be gauged by viewing personnel under special light once they remove their protective clothing. Any contaminated areas on the personnel will glow under the special light.

The present invention will be better understood with reference to the following example, which is intended to illustrate a specific embodiment within the overall scope of the invention as claimed.

EXAMPLE 1

The viscosity of a mixture of PEG200 and water is changed by changing the relative amount of water in the mixture. PEG200 is a thickening agent and water is a diluent. By increasing the amount of water in the mixture, the viscosity of the mixture can be decreased down to 1.14 cm$^2$/s (stokes) at 22° C., the viscosity of 100% water. By decreasing the amount of water in the mixture, and thus increasing the percentage PEG200 in the mixture, the viscosity of the mixture can be increased to 50.5 stokes at 22° C., the viscosity of 100% PEG200.

Using the above equation, the amount of water and PEG200 needed to match the viscosity of a variety of known hazardous chemicals was determined. The results are displayed in the Table below. According to the table, by mixing 57.96 vol. % water with 42.04 vol. % PEG200 a mixture having a viscosity of 5.175 stokes, the known viscosity of distilled mustard, is prepared. By adding a phosphor that responds ultraviolet light to this mixture, for example, Tinopal, a hazardous chemical simulant that can be quickly identified under a black light can be prepared.

As can be seen in the Table below, hazardous chemical simulants that have the viscosity of a variety of known hazardous chemicals can be prepared from a mixture of water and PEG200.

TABLE

| Hazardous Chemicals | Amount of Water (vol. %) | Amount of PEG200 (vol. %) |
|---|---|---|
| Distilled Mustard (HD)/ viscosity = 5.175 | 57.96 | 42.04 |
| Soman (GD)/ viscosity = 3.098 | 70.98 | 29.02 |
| Tabun (GA)/ viscosity = 2.18 | 79.90 | 20.10 |
| Lethal Nerve Agent (GB)/ viscosity = 1.283 | 93.36 | 6.64 |
| Lewisite/viscosity = 2.257 | 79.02 | 20.98 |
| Lethal Nerve Agent (VX)/viscosity = 9.958 | 41.35 | 58.65 |

The FIGURE shows a plot of viscosity of a mixture of water and PEG200 v. vol. % water at 22° C., and an exponential fit of the data points. As the FIGURE shows, hazardous chemical simulants can be prepared from a mixture of water and PEG200 for any hazardous chemical that has a viscosity between the viscosity of water and PEG200. Hazardous chemical simulants having a viscosity less than water can be prepared by using a less viscous diluent. Hazardous chemical simulants having a viscosity more than PEG200 can be prepared using a more viscous diluent.

EXAMPLE 2

A hazardous chemical simulant that simulates distilled mustard is made by mixing together 57.96 ounces of water, 42.04 ounces of PEG200, and one tablespoon of Tinopal to form a mixture having a viscosity of 5.175. This mixture is then placed in a spray bottle for distribution.

An individual puts on protective clothing that is capable of protecting the wearer from distilled mustard. The protective clothing includes a chemical protective undergarment (CPU) and personal protective equipment (PPE). The CPU is worn under the PPE. The CPU is a garment that covers the legs and torso of the wearer. The PPE includes a one piece suit that covers the legs and torso, a hood that covers the head, boots that cover the feet, and gloves that cover the hands of the wearer. The PPE covers the whole body of the individual, protecting the wearer from hazardous chemicals. Additional protective clothing includes two pairs of socks that cover the feet under the boots and a mask that covers the face and is worn under the hood.

The individual wearing the protective clothing is then sprayed with the hazardous chemical simulant to simulate a contaminated individual. Decontamination personnel then setup a decontamination area for decontaminating the contaminated individual. A decontamination procedure for decontaminating a contaminated individual is then performed. The procedure begins with the contaminated individual patting down the outside of the PPE with M295, a chemical absorbent pad. The absorbent removes some of the hazardous chemical simulant from the outside of the PPE.

The contaminated individual then proceeds to a first shuffle pit that contains sodium dodecyl sulfate (SDS), a chemical absorbent. The shuffle pit is a container that has no top portion and is 20 inches long by 20 inches across and 4 inches deep. The contaminated individual shuffles their feet in the first shuffle pit. The SDS in the first shuffle pit absorbs hazardous chemical simulant that may be present on the bottom of the boots of the contaminated individual.

The contaminated individual then steps out of the first shuffle pit and into a second shuffle pit. In the second shuffle pit, straps on the hood of the PPE are cut and the neck cord of the PPE is loosened. The hood of the PPE is then removed by rolling the hood from the rear bottom portion of the hood up over the contaminated individual's head.

Once the hood of the PPE is removed, wrist, waist and ankle closures on the PPE suit are cut. The closures on the contaminated individual's boots are also cut. The boots of the contaminated individual are then removed.

An incision is then made down the back of the PPE suit. The cut is made from the top of the suit, starting under the hood, all the way down the back of one leg of the suit. A second cut is then made down the second leg of the suit starting from the buttocks area of the suit. The suit is then removed folding the suit forward into itself. In this manner, the suit is turned inside out during the removal process. Any gloves worn by the contaminated individual are also removed along with the suit.

An incision is then made down the back of the CPU from the top neck portion of the CPU down to the waste portion of the CPU. The contaminated individual then extends his arms forward as decontamination personnel pull the torso portion of the CPU forward down over the arms, while folding the CPU into itself. A cut is then made down the outside of each leg of the CPU. The contaminated individual can then step out of the CPU.

The contaminated individual then removes their outer socks and then their inner socks. The contaminated individual then steps directly onto a safety pad that is impregnated with a decontaminate. The hands of the contaminated individual are then decontaminated. Lastly, the contaminated individual removes his mask.

Following the decontamination procedure, the contaminated individual steps under an ultraviolet light. Hazardous chemical simulant that was transferred from the protective clothing to the contaminated individual during the decontamination process glows under the light and is identified. In this manner, the effectiveness of the decontamination procedure and the trained decontamination personnel is ascertained in a safe and effective way.

Having now fully described this invention, it will be appreciated by those skilled in the art that the invention can be performed within a wide range of parameters within what is claimed, without departing from the spirit and scope of the invention.

What is claimed is:

1. A hazardous chemical simulant consisting of:
   (A) from 0.1 vol. % to 99.9 vol. % diluent,
   (B) from 0.1 vol. % to 99.9 vol. % thickening agent comprising polyethylene glycol, and
   (C) a detecting agent, wherein the detecting agent fluoresces in the presence of ultraviolet light and wherein the vol. % of diluent and the vol. % of thickening agent are selected to match the viscosity of a predetermined hazardous chemical.

2. The hazardous chemical simulant of claim 1, wherein the diluent comprises water.

3. The hazardous chemical simulant of claim 1, wherein the thickening agent comprises polyethylene glycol with a molecular weight of 200.

4. The hazardous chemical simulant of claim 1, wherein the hazardous chemical simulant is colorless in normal lighting conditions.

5. The hazardous chemical simulant of claim 1, wherein the predetermined hazardous chemical is selected from the group consisting of Distilled Mustard (HD), Soman (GD), Tabun (GA), Sarin (GB), Lewisite (L), and Nerve Agent (VX).

* * * * *